(12) United States Patent
Jackman

(10) Patent No.: US 8,820,315 B2
(45) Date of Patent: Sep. 2, 2014

(54) SOLAR HEATING SYSTEM WITH OVERHEATING PROTECTION

(75) Inventor: Thomas J Jackman, Calgary (CA)

(73) Assignee: Trathom Corporation, Calgary (CA)

( * ) Notice: Subject to any disclaimer, the term of this patent is extended or adjusted under 35 U.S.C. 154(b) by 854 days.

(21) Appl. No.: 12/712,325

(22) Filed: Feb. 25, 2010

(65) Prior Publication Data

US 2011/0203572 A1    Aug. 25, 2011

(51) Int. Cl.
| | |
|---|---|
| *F24J 2/40* | (2006.01) |
| *F24J 2/42* | (2006.01) |
| *F24D 11/00* | (2006.01) |
| *F24D 19/00* | (2006.01) |
| *F24J 2/46* | (2006.01) |

(52) U.S. Cl.
CPC *F24J 2/4625* (2013.01); *F24J 2/42* (2013.01); *F24D 11/003* (2013.01); *Y02B 10/20* (2013.01); *Y02E 10/40* (2013.01); *F24H 2240/09* (2013.01); *F24D 19/0095* (2013.01); *F24J 2/463* (2013.01)
USPC ............ 126/591; 126/592; 126/594; 126/595

(58) Field of Classification Search
USPC ......... 126/591, 596, 571, 572, 576, 579, 582, 126/584, 585, 588, 589, 594, 595, 598, 599, 126/646, 617, 651, 597, 611, 613
See application file for complete search history.

(56) References Cited

U.S. PATENT DOCUMENTS

| | | | | |
|---|---|---|---|---|
| 2,520,446 | A * | 8/1950 | Thrush | 236/12.14 |
| 3,116,748 | A * | 1/1964 | Wasson | 137/98 |
| 3,964,464 | A * | 6/1976 | Hockman | 126/572 |
| 4,010,734 | A * | 3/1977 | Chayet | 126/587 |
| 4,034,738 | A * | 7/1977 | Barber, Jr. | 126/586 |
| 4,473,063 | A * | 9/1984 | Mackensen | 126/591 |
| 4,528,976 | A | 7/1985 | Baer | |
| 5,505,917 | A * | 4/1996 | Collier, Jr. | 422/307 |

FOREIGN PATENT DOCUMENTS

| | | |
|---|---|---|
| CA | 1080566 | 7/1980 |
| EP | 04727915 | 10/2004 |

OTHER PUBLICATIONS www.apricus.com/html/solar_heat_dissipator.htm; 2008.

* cited by examiner

*Primary Examiner* — Avinash Savani
*Assistant Examiner* — Vivek Shirsat
(74) *Attorney, Agent, or Firm* — Goodwin McKay; Linda Thompson (57) ABSTRACT

A simple solar heating system incorporates a heat dissipater into a heat exchange circuit for bypassing solar collectors when either the temperature or the pressure in the heat exchange circuit exceeds preset limits. In the absence of electric controllers, fluid in the heat exchange circuit is caused to bypass the solar collectors using a valve which is controlled by either the temperature or pressure of the fluid. A solar photovoltaic panel energizes a circulating pump for increasing the rate of pumping as more solar energy is available at the PV panel and decreasing the rate as solar energy decreases.

16 Claims, 9 Drawing Sheets

SOLAR HEATING SYSTEM WITH OVERHEATING PROTECTION

FIELD OF THE INVENTION

Embodiments of the invention relate to solar heating systems and more particularly to systems for use with solar water heaters that are independent of the electrical utility grid and that substantially prevent overheating of fluids circulating therethrough.

BACKGROUND OF THE INVENTION

Collection of solar energy for use in heating fluids, such as water, is a well known concept with rudimentary systems originating in ancient times. Modern solar heating systems typically incorporate a solar collector that converts the sun's energy to thermal energy and utilize a variety of means to transfer the collected thermal energy into the fluid to be heated, such as for residential, commercial or industrial heating applications.

Solar water heaters may be combined systems or distributed systems. In the case of a combined system, a domestic water storage tank is typically mounted directly to the solar collector. Combined systems are generally not practical in colder climates as the hot water storage tank is cooled by the cold ambient air. In the case of a distributed system, the solar collector is typically located remote from the heated water storage tank, the storage tank being placed in a sheltered location to avoid heat loss to the atmosphere. Distributed solar water heaters are common.

"Direct" solar water heater systems circulate the domestic water to be heated through the solar collector. Direct systems are typically prone to scaling of the collector as a result of the domestic water passing therethrough. Further, direct systems require the collector to be drained when ambient temperatures fall below the freezing point of water (0° C.). Direct systems can be configured as either combined systems or distributed systems.

More sophisticated distributed systems known as "indirect" heating systems circulate a heat transfer fluid or working fluid between the solar collector and a potable water heat exchanger which transfers the solar heat from the working fluid into the potable water. The heat exchanger, such as a tubular coil, may be placed inside a potable water tank for transferring heat from the working fluid circulating through the coil to the water in the tank. Alternatively, the heat exchanger can be located external to the potable water tank, the potable water circulating on one side of the heat exchanger and the working fluid on the other side. Indirect systems typically use a working fluid that comprises agents to reduce scaling and an anti-freeze agent to avoid freezing of the working fluid.

Solar energy can only be harnessed when the sun is shining and some of the heat gained during the day is lost if the potable water or working fluid continues to circulate during nights or during periods of low solar potential. Consequently conventional solar systems require a means for stopping circulation of the working fluid during non-heating conditions. Some systems use a "drain-back" approach that drains the working fluid into a holding tank during the non-heating periods. Systems that don't "drain-back" require enough anti-freeze agent to ensure the working fluid does not freeze up and damage the piping or solar collector.

A significant issue with solar water heating systems is how to mitigate excessive heat. During periods when solar heating of the potable water exceeds the demand for heated potable water, heat will build up in the system. If means for releasing pressure are not provided, excess heat leads to boiling of the working fluid and the resultant pressure increases will rupture the piping or solar collector. Conventionally, overheating is addressed using a number of different mechanisms. "Heat dumps" dissipate excess heat to the atmosphere or through a ground loop or other location. Alternatively, the system is drained back and shut down or the system controller can be manually set to a "vacation" setting that diverts the heat from the potable water system.

Often systems are deliberately under-sized to avoid the overheating challenge. In this case, the solar collector system is sized such that its peak output will provide 90% of the minimum anticipated heat load. As the output of the solar collectors is seasonally dependent, this approach usually results in the solar water heating system contributing about half of the water heating requirement, the remainder being provided through conventional non-solar water heating systems and requiring a reliance on the electric utility grid or other external energy provider. Thus, it is clear in these cases that solar collection is not maximized.

Canadian Patent 1,080,566 to Cummings teaches a solar water heater incorporating a heat rejecting loop to attempt to cool the system. The system is complex and incorporates two separate fluid circuits; one comprising a heat absorbing loop fluidly connected to a heat rejecting loop and the second comprising a heat pickup loop thermally coupled to the solar panel to carry thermal energy away from the panel to the point of use. Circulation of fluid through at least the heat absorbing and heat rejecting loops is solely by gravity and thermal convective effects.

EP 04727915 to Torrens teaches a complex solar collection system in series with a hot water system. A heat dissipater circuit, which may comprise at least part of the panel framework, is used for cooling at least a portion of hot water exiting the solar panels when the water is overheated. The inlet to the heat dissipater is downstream from the solar panels and thus all of the fluid must first be heated and then at least a portion cooled for cooling the system. Torrens relies upon thermosiphon effects in the event of pump failure to ensure all of the water in the system is directed through the heat dissipater to prevent overheating. Applicant believes it is likely that there will be insufficient impetus for thermosiphon within the complex piping of Torrens, resulting in the possibility of overheating of the fluids therein despite the heat dissipation circuit. The Torrens system is particularly unsuitable for use where ambient temperatures fall below freezing as it is a direct system.

Apricus Solar Co. Ltd. (www.apricus.com/html/solar-_heat_dissipator.htm) teaches a solar hot water system comprising a fin and tube heat dissipater connected downstream from solar collectors. The system as described utilizes an electrically powered controller and a solenoid valve operated by the controller, to direct overheated fluid from the solar collectors to the heat dissipater. Alternatively, it is mentioned that a thermostatic valve may be used. All of the fluid in the heat transfer circuit is first heated in the solar collector after which at least a portion of the fluid is directed to the heat dissipater for cooling after which the cooled fluid is mixed into the stream of overheated fluid. In cases of peak insolation, sufficient heat may not be released by the heat dissipater. Following heat dissipation, the temperature of the re-mixed working fluid may be inconsistent as the efficiency of the heat dissipater varies with atmospheric conditions. If excessive heat dissipation occurs the efficiency of the system is reduced. If insufficient heat dissipation occurs there remains a risk that the system will over-heat.

Current indirect-distributed systems typically utilize electronic control systems to activate pumps and valves to operate the system. The electronic controller utilizes preprogrammed logic to operate the valves and pumps as conditions determine when to circulate fluid to the solar collector, when to drainback or load the working fluid, if applicable, when to circulate through an external heat exchanger and when to activate systems which handle excess heat, if available. The operating conditions are measured by electronic temperature and pressure sensors which are connected electrically to the electronic controller. Thus, these control and operating systems require electrical energy which is usually supplied from the electric utility grid. Loss of electrical energy will, at a minimum, cause loss of solar heating. It can also potentially cause damage to the system should the system overheat, result in injuries such as scalding and result in collateral damage to the building such as stained walls and floors caused by overflow of working fluid from ruptured lines and the like.

In order to deal with these problems, some systems provide a battery backup to enable the system and controller to operate for a period of time when the power goes out. In some cases, solar photovoltaic (PV) systems are available to supply the necessary electrical energy either directly to the solar heating system and controller or indirectly, such as through a battery pack.

In addition to requiring electrical energy to operate the solar heating system, electronic control methods are prone to component failure especially when considered in the context of the twenty-year life of a typical solar water heating system. Failure of the electronic control system can lead to piping or component damage and collateral damage similar to that which occurs with the loss of electrical energy. Battery systems also have a shorter life expectancy, usually in the five to ten year range. Failure to test and replace the battery system can lead to same type of damage seen with loss of electrical energy.

Ideally, what is required is a solar water heater system that is simple, efficient and requires no reliance on the electric utility grid or other external energy provider. The solar water heater system should be capable of meeting maximum demand during periods of low insolation without concern of overheating and the resulting potential damage to the systems and structures during periods of high insolation, and particularly during periods where there is also a low demand.

SUMMARY OF THE INVENTION

A self-controlled solar heating system and method of use is independent of the electrical utility grid or external energy provider and operates substantially without risk of overheating during periods of maximum insolation, despite being sized for maximum solar energy absorption. When the temperature or pressure of a fluid in the heat exchange circuit exceeds a preset operating maximum, some of the fluid is caused to automatically bypass the solar collectors to enter a heat dissipater. Fluid in the system is pumped at a rate relative to the amount of solar energy available using a solar powered pump.

In one broad aspect of the invention, apparatus for maximizing thermal energy collection in a solar collection system independent from the electric utility grid or external energy provider comprises: one or more solar collectors; a heat exchange circuit having fluid therein and being thermally connected between the one or more solar collectors and a point of use; a solar powered pump for substantially continuously pumping the fluid through the heat exchange circuit during solar energy collection; a heat dissipater fluidly connected to the heat exchange circuit and having an inlet upstream from the one or more solar collectors and an outlet downstream from the one or more solar collectors; and a valve positioned downstream from the heat dissipater which, when closed in response to a condition being at or below a maximum preset operating condition, prevents fluid from entering the heat dissipater; and when opened in response to the condition exceeding the maximum preset operating condition, permits at least a portion of the fluid in the heat exchange circuit to bypass the one or more solar collectors to flow through the heat dissipater for cooling the at least a portion of the fluid, the cooled fluid being returned to the heat exchange circuit thereafter through the outlet for maintaining the working fluid at or below the maximum preset operating condition.

In another broad aspect of the invention, a method for maximizing thermal energy collection in a solar collection system independent from the electric utility grid or external energy provider comprising one or more solar collectors, and a heat exchange circuit having fluid therein, the heat exchange circuit being thermally connected between the one or more solar collectors and a point of use, the method comprising: continuously pumping fluid through the heat exchange circuit and the one or more solar collectors during solar energy collection using a solar-powered pump to heat the fluid and when a condition of the heated fluid exceeds a maximum preset operating condition; bypassing at least a portion of the continuously pumped fluid around the one or more solar collectors through a heat dissipater for producing a cooled fluid; and recombining the cooled fluid with the heated fluid in the heat exchange circuit downstream from the solar collector for cooling the heated fluid for maintaining the working fluid at or below the maximum preset operating condition.

In embodiments of the invention, the valve which opens to flow fluid to the heat dissipater and bypass the solar collectors is actuated by either temperature or pressure.

In embodiments of the invention the system can be either an indirect system, wherein the working fluid flowing through the heat exchange circuit is a fluid such as glycol, or a direct system wherein the fluid which is circulated through the heat exchange circuit is the fluid to be used at the point of use, such as potable water.

DETAILED DESCRIPTION OF THE PREFERRED EMBODIMENT

Embodiments of the invention comprise self-controlling solar heating systems having one or more solar collectors, an excess heat dissipater, and an elegant yet simple heat transfer circuit fluidly connected between the solar collectors and a point of use. A variable speed direct current (DC) pump circulates fluid through the heat transfer circuit, powered by a photovoltaic panel so as to remove any reliance upon an external energy provider. The pumping rate of the fluid is self-controlling and relative to the amount of solar energy available.

The heat dissipater is fluidly connected around the solar collectors. Without a need for a sophisticated controller, upon overheating, a valve directs at least a portion of the fluid to flow through the heat dissipater for bypassing the solar collectors and cooling the fluid. The valve opens when the fluid exceeds a preset threshold condition in the fluid which is indicative of overheating. The valve is positioned in the heat transfer circuit downstream from both the solar collectors and the heat dissipater. As the valve opens, at least a portion of the fluid bypasses the solar collector, fluid flowing both through the heat dissipater and the solar collectors. Cooled fluid from the heat dissipater mixes with heated fluid exiting the solar collectors for maintaining the working fluid below the preset threshold operating condition, being either temperature or pressure.

As atmospheric conditions vary, the valve modulates between open and closed so as to alter the rate of fluid flowing through the heat dissipater. Thus the system automatically and efficiently maintains the working fluid at as close to the maximum operating condition without exceeding the preset threshold.

In order to understand the simplicity and the reliability of the overheating protection accomplished without reliance upon the electric utility grid or external energy provider and according to embodiments of the invention, it is first necessary to understand the flow paths of some complex prior art systems which also employ heat dissipaters.

PRIOR ART SYSTEMS

Figure 1A:
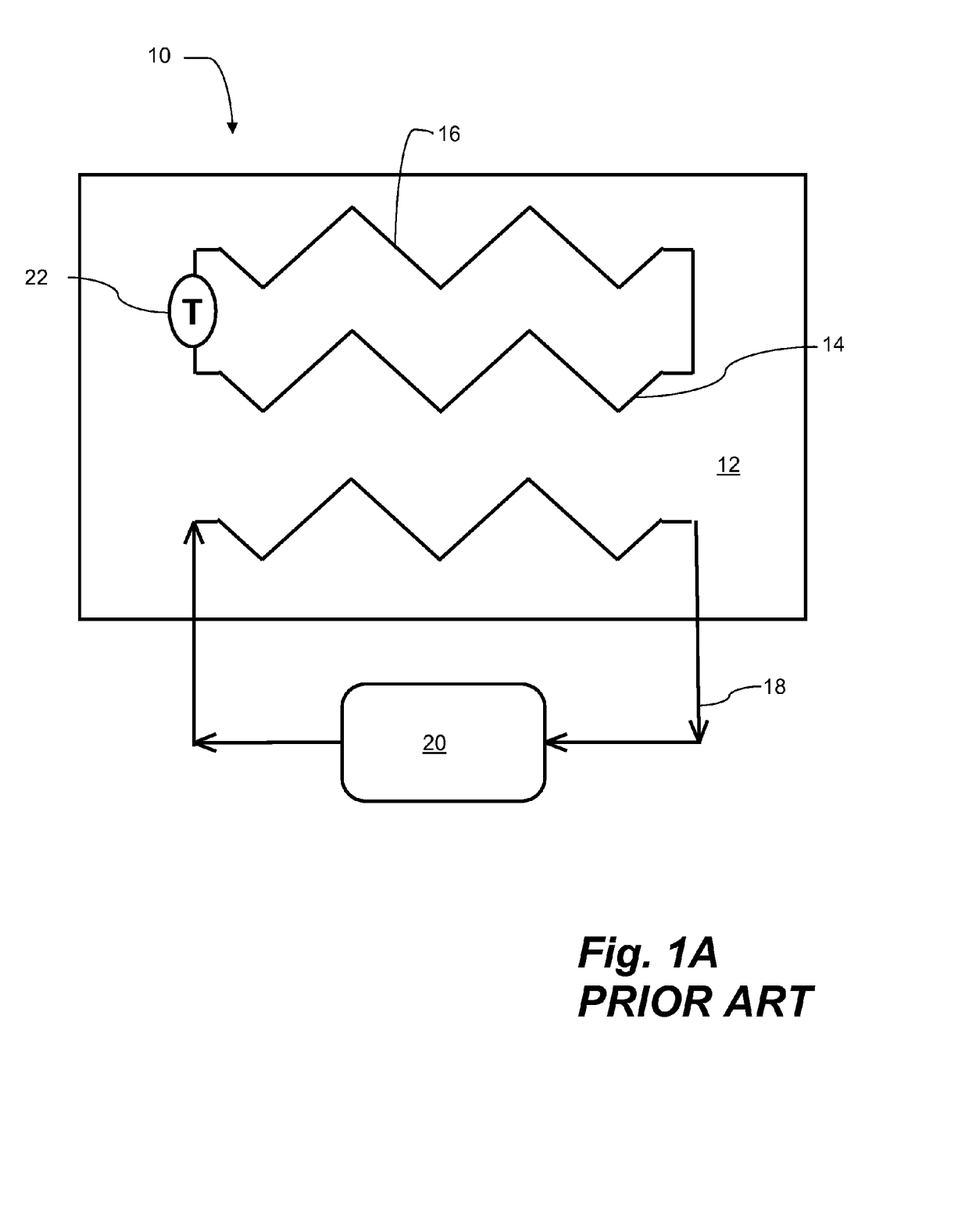
FIGS. 1A-1D are schematics illustrating flow paths of some prior art, more complex, solar heater systems.

As shown in simplified schematic FIG. 1A, Canadian Patent 1,080,566 to Cummings teaches two separate fluid circuits. A first circuit 10 within a solar panel 12 comprises both a heat absorbing loop 14 and a heat dissipating loop 16. A second circuit or heat-pickup loop 18 picks up heat within the panel 12 and circulates fluid therein outside the solar panel 12 to a point of use 20, typically a heat exchanger in a water tank. A thermally actuated valve 22 is positioned between the heat-absorbing loop 14 and the heat-dissipating loop 16. When the temperature in the heat-absorbing loop exceeds a preset threshold, the valve 22 opens for directing the fluid to the heat-dissipating loop 16. The system relies solely upon differential buoyancy and thermosiphon effects to circulate fluid through at least the first circuit 10. Applicant believes that the heat-dissipating loop 16 acts to cool the solar panel 12, but is less effective in cooling the working fluid. Further Applicant believes that there are potential efficiency losses if the heat-pickup loop 18 loses heat to the first circuit 10.

Figure 1B:
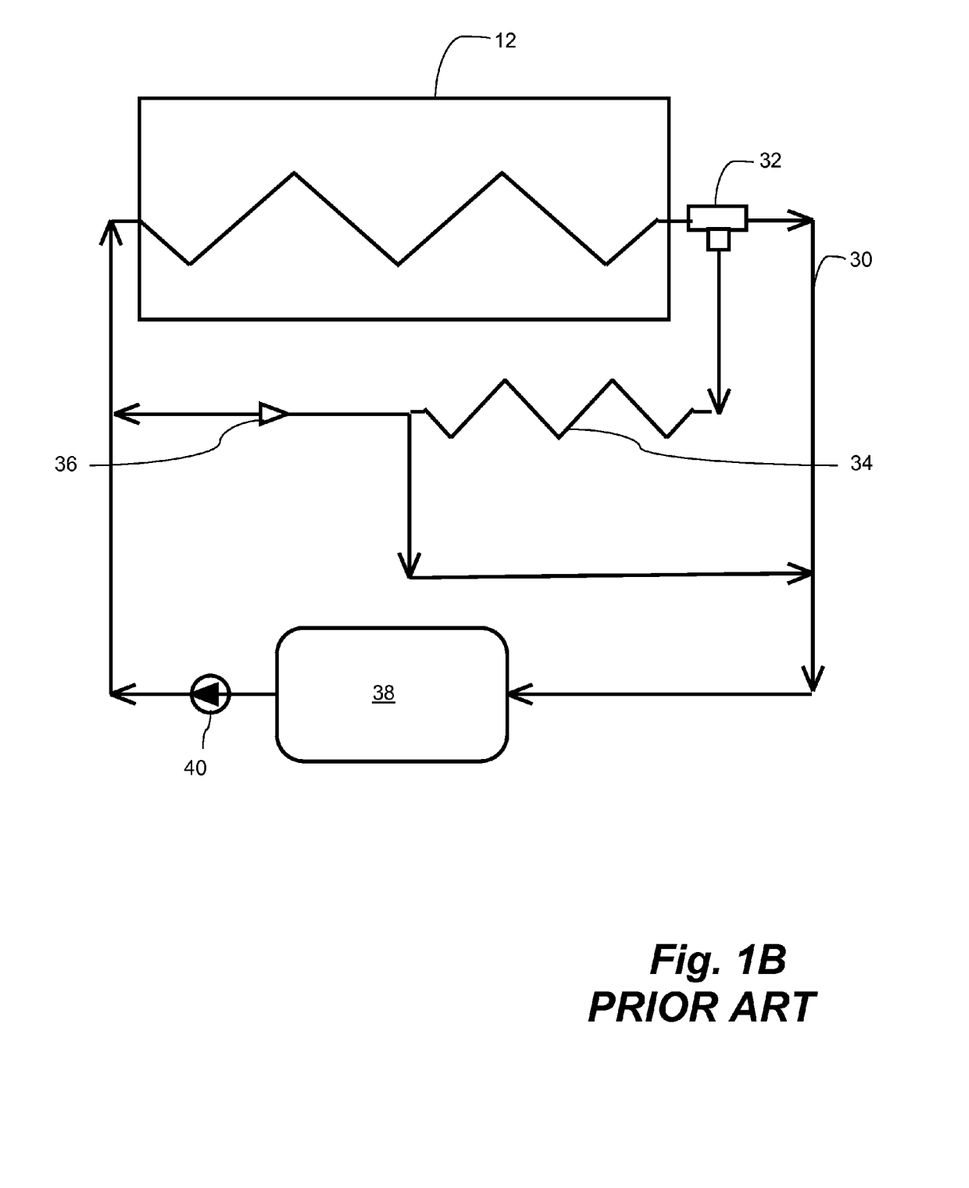
Figure 1C:
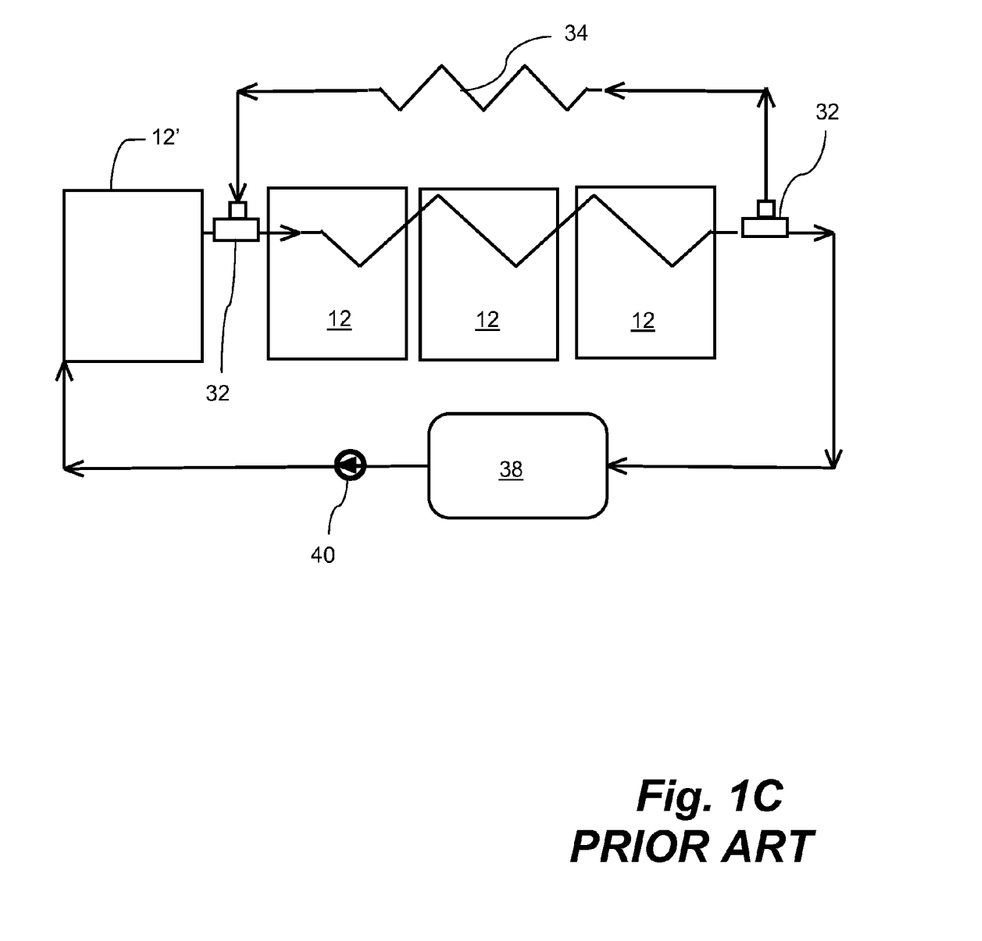

Simplified schematics, FIGS. 1B and 1C, illustrate two embodiments taught by EP04727915 to Torrens. Torrens utilizes a heat exchange circuit 30 to circulate water through a series of solar panels 12. In a first embodiment (FIG. 1B) a thermostatic T-valve 32 is positioned downstream from the solar panels 12 and upstream from a heat dissipater 34. In this embodiment, all of the fluid in the heat transfer circuit must pass through the solar panels 12 and be heated therein. Thereafter, a portion of the flow is directed to the heat dissipater 34 for cooling therein. Torrens employs a check valve 36 between the heat dissipater 34 and the heat exchange circuit 30. Torrens states that the check valve 36 is designed to ensure fluids exiting the heat dissipater 34 return to the heat exchanger circuit 30 upstream from a point of use 38 for cooling the fluid therein, when a pump 40 which circulates fluid in the heat exchange circuit 30 is functioning. Applicant believes it likely that there is more resistance to flow through the heating load and therefore, unless a very high resistance check valve is used, fluids are likely to bypass the heating load through the check valve. In this case there is reduced flow of fluids though the heating load reducing the energy available to the working load and ultimately reducing the efficiency of the overall system.

Torrens also illustrates that in the event of a pump failure or loss of electricity, hot fluid exiting the solar panel is directed by thermosiphon through the check valve 36 and back to the series of solar panels 12, bypassing the point of use 38. If a high resistance check valve 36 is used to prevent bypass of the heating load in regular use, it is more unlikely that there would be significant impetus for fluids to flow through the check valve 36 by thermosiphon in the event that the pump 40 or the electricity fails.

In an alternate embodiment (FIG. 1C), where the heat dissipater 34 is part of the solar panel framework, Torrens does not use a check valve 36 but instead separates a first solar collector 12' from the remaining solar collectors 12 using a thermostatic valve 32 and in the event of a need to cool water exiting the remaining solar collectors 12, passes water through the heat dissipater 34 for recycling through the remaining solar collectors 12. Applicant assumes that in the event of a pump failure, maintaining the first solar panel 12' cooler than the remaining solar panels 12 permits some thermosiphon effect, however it is unclear if the system would operate as described.

Figure 1D:
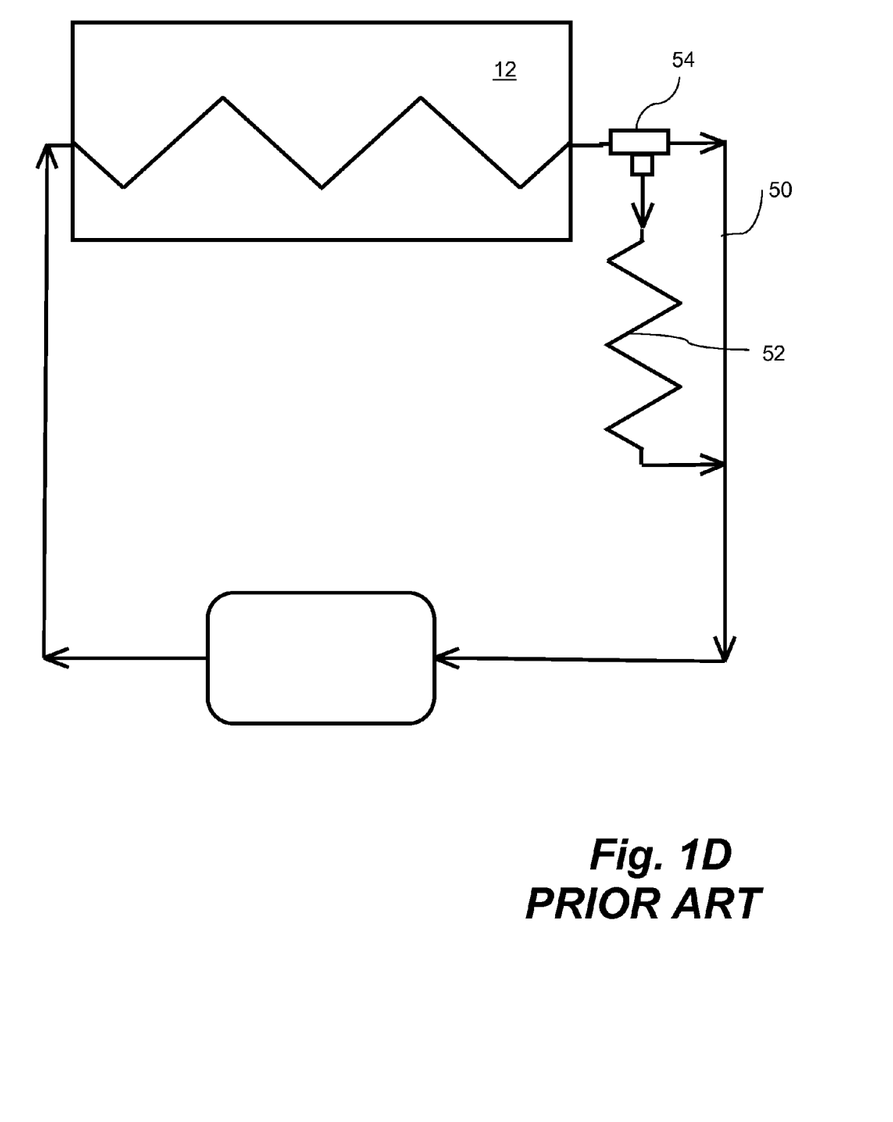

As illustrated in FIG. 1D, Apricus Solar Co. Ltd., teaches a system having solar panels 12 and a heat exchange circuit 50, incorporating a fin and tube heat dissipater 52 connected downstream from the solar collectors 12. An electrically powered controller and a solenoid valve, operated by the controller, direct overheated fluid from the solar collectors 12 to the heat dissipater 52. Alternatively, it is mentioned that a thermostatic valve 54 may be used. All of the fluid in the heat transfer circuit 50 is first heated in the solar collectors 12 after which at least a portion of the fluid is directed to the heat dissipater 52 for cooling after which the cooled fluid is mixed into overheated fluid in the heat exchange circuit 50 for cooling the fluid therein.

EMBODIMENTS OF THE INVENTION

Embodiments of the invention are described herein in the context of a domestic hot water heater. As those of skill in the art will appreciate however, the system as described can be used to collect solar energy for a variety of purposes and therefore the system is not limited solely for use as a water heater for domestic hot water use. Other uses may include pool heating, space heating via hydronics, forced-air, radiant or other fluid-based space heating processes, process water or fluid heating for industrial, refining, processing, smelting or commercial operations; heating of cleaning water for commercial laundries, car washes or similar uses; or any other heating or pre-heating application, either directly or indirectly from the solar heated fluid.

In an embodiment of the invention, as shown in FIGS. 2A, 2B, 3 and 4, the solar water heater system 110 comprises one or more solar collectors 112, such as evacuated-tube heat-pipe collectors, flat plate solar collectors or any other type of solar thermal collector or panel, for absorbing solar energy from the sun.

Figure 2A:
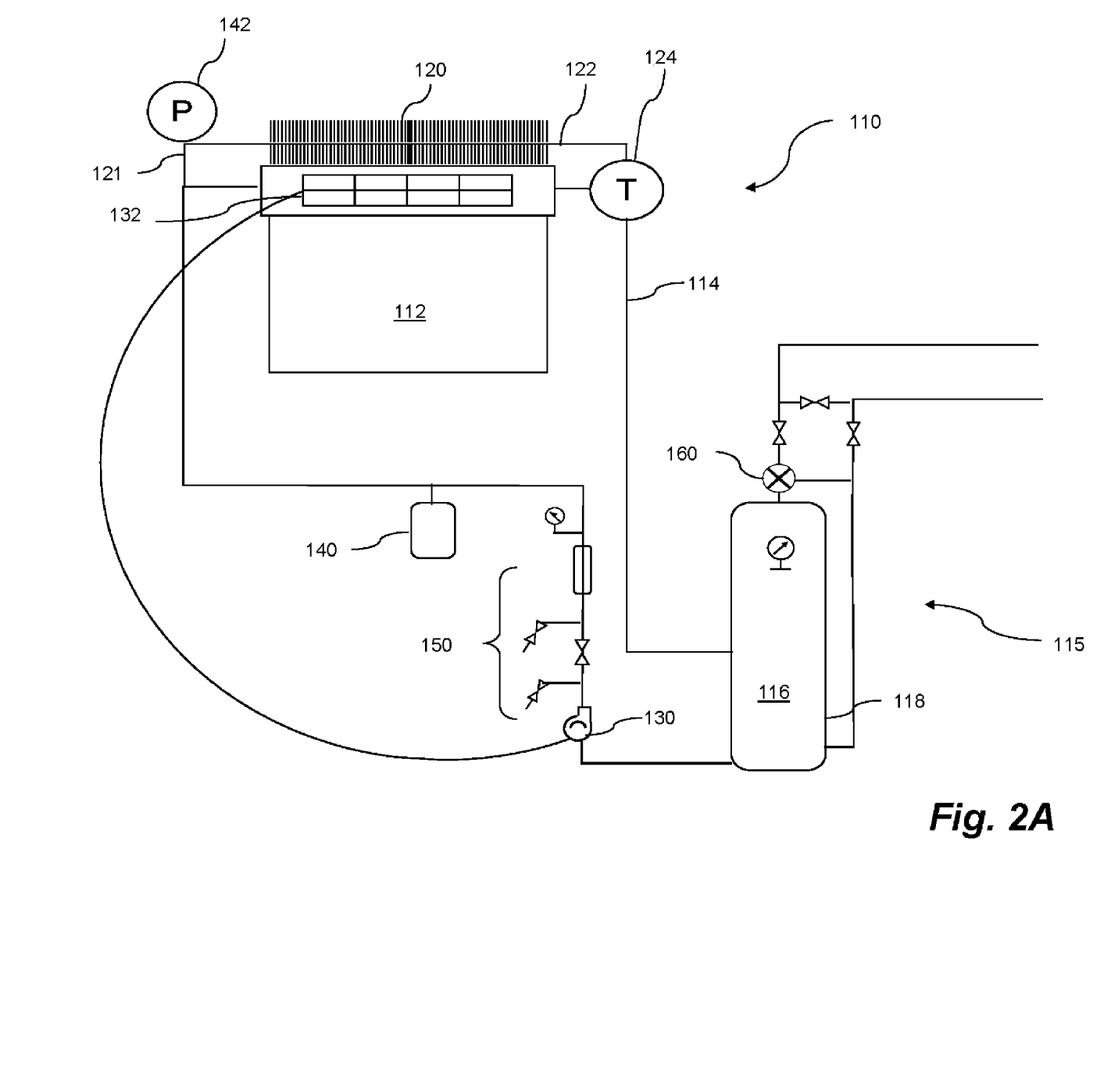
FIG. 2A is a schematic illustrating a solar water heater system according to an embodiment of the invention.
Figure 2B:
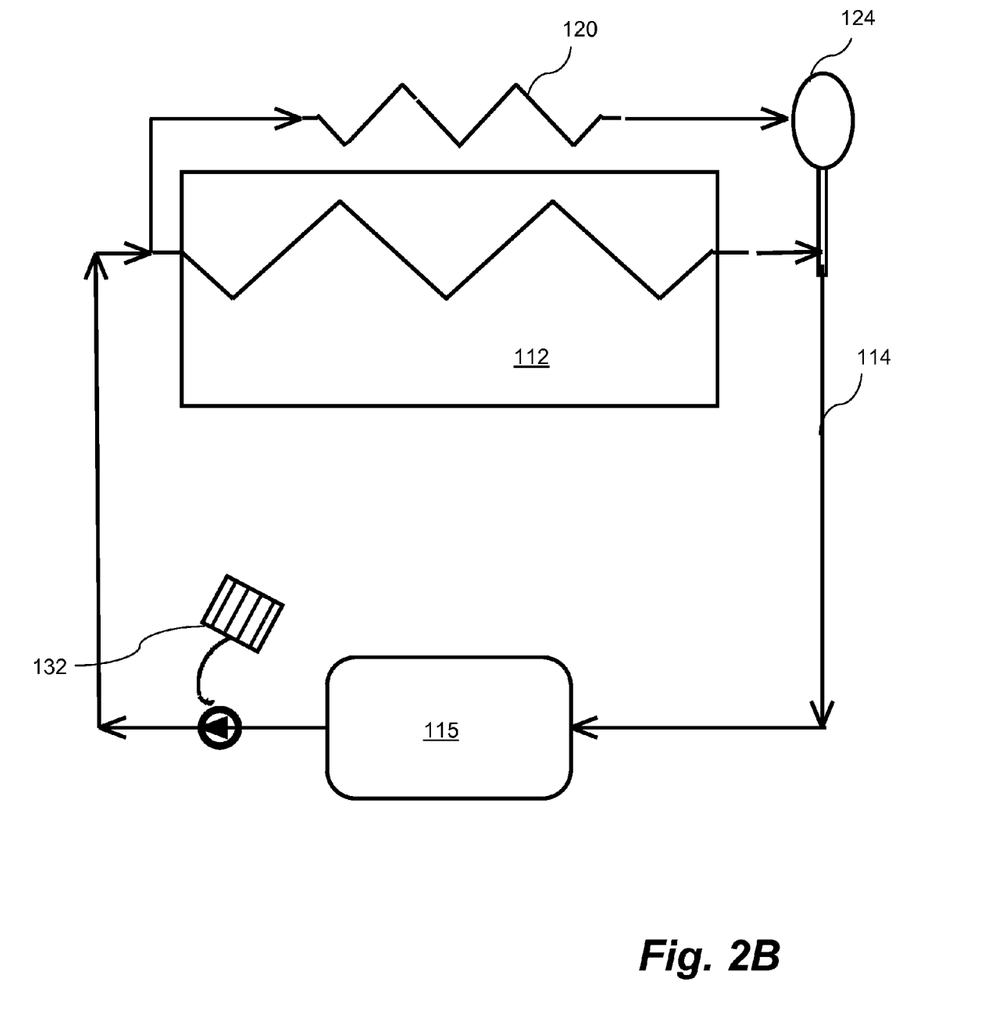
FIG. 2B is a schematic illustrating flow paths in the solar water heater system of FIG. 2A.

A heat transfer or exchange circuit 114 is connected for circulating a working fluid between the solar collectors 112 and a point of use 115. The solar water heater system 110 can be either an indirect system or a direct system.

Embodiments of the solar heater system 110, whether direct or indirect, further comprise a heat dissipater 120 which is connected to the heat exchange circuit 114. The heat dissipater 120 forms a bypass around the solar collectors 112, connected at an inlet 121 upstream of the solar collectors 112 and connected at an outlet 122 downstream thereof. The heat dissipater permits at least a portion of the circulating fluid in the heat exchange circuit 114 to bypass the solar collectors 112 when a condition of the fluid related to overheating exceeds a preset threshold. The flow of fluid to the heat dissipater is modulated to maintain the condition of the fluid at or below the maximum preset condition.

In embodiments of the invention, the condition of the fluid is generally either the temperature of the fluid or the pressure of the fluid.

In embodiments of the invention, the solar collectors 112 are sized to absorb the maximum solar energy available and the heat dissipater 120 is sized accordingly.

The system 110 is further described herein in the context of an indirect system using temperature as the condition indicative of overheating. Those of skill in the art would appreciate however that the description is equally applicable in the case of a direct system or where pressure is the condition of the fluid indicative of overheating.

Accordingly, using temperature as the condition, a thermally-actuated control valve 124 is positioned in the heat exchange circuit 114 downstream from the solar collectors 112. In one embodiment, the valve 124 is located at the conjunction of the heat dissipater 120 and the solar collectors 112. As shown, the valve 124 can be a three-way valve, receiving fluid from the solar collector or both the heat dissipater and the solar collectors for discharge back to the heat exchange circuit 114.

If the temperature of the working fluid exiting the solar collectors 112 reaches a preset threshold, the valve 124 opens to fluidly connect with the heat dissipater 120 to permit at least a portion of the circulating working fluid to exit the heat dissipater 120. Accordingly, at least a portion of the fluid which would otherwise enter the solar collectors 112 instead enters the heat dissipater 120 for producing a cooled fluid. The cooled fluid is thereafter mixed with the heated fluid exiting the solar collectors 112. When the temperature of the working fluid is below the preset threshold or maximum preset operating temperature, such as when sufficient heat has been utilized at the point of use 115 or has been dissipated from the working fluid, the valve 124 closes to again direct the entirety of the flow of working fluid through the solar collectors 112. The valve 124 modulates between open and closed. As previously noted, changes in atmospheric conditions can alter heat dissipation from the heat dissipater 120. As the temperature of the heated working fluid changes in response to changes in heat dissipation, the flow of fluid entering the heat dissipater 120 is automatically changed or modulated by the thermally-actuated control valve 124 so as to maintain the temperature of the working fluid at the maximum preset operating temperature.

Figure 3:
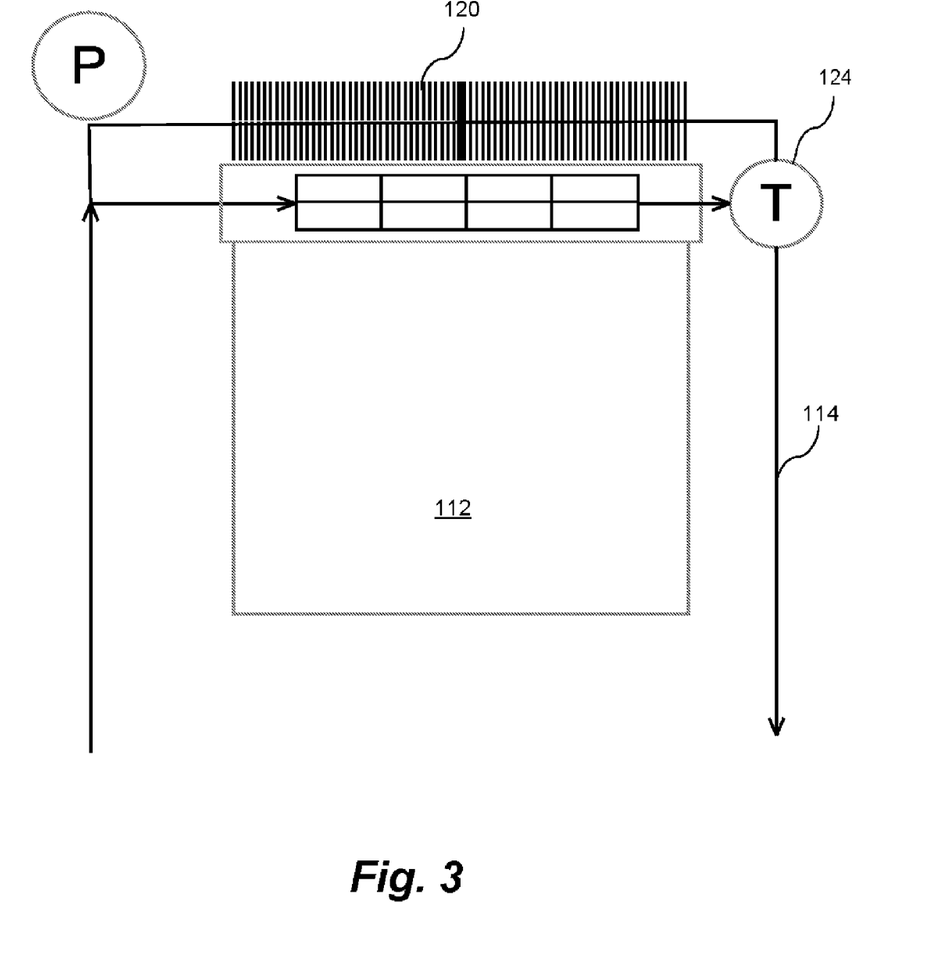
FIG. 3 is a schematic illustrating flow of working fluid through the solar water heater system of FIG. 2A, during a normal heating cycle.

Thus, as shown in FIG. 3, in normal operation, when the temperature of the working fluid exiting the solar collectors is below the maximum preset operating temperature, the thermally-actuated control valve 124 remains closed and none of the working fluid is circulated through the heat dissipater. The temperature of the working fluid is substantially continuously monitored by the thermally actuated control valve 124.

Figure 4:
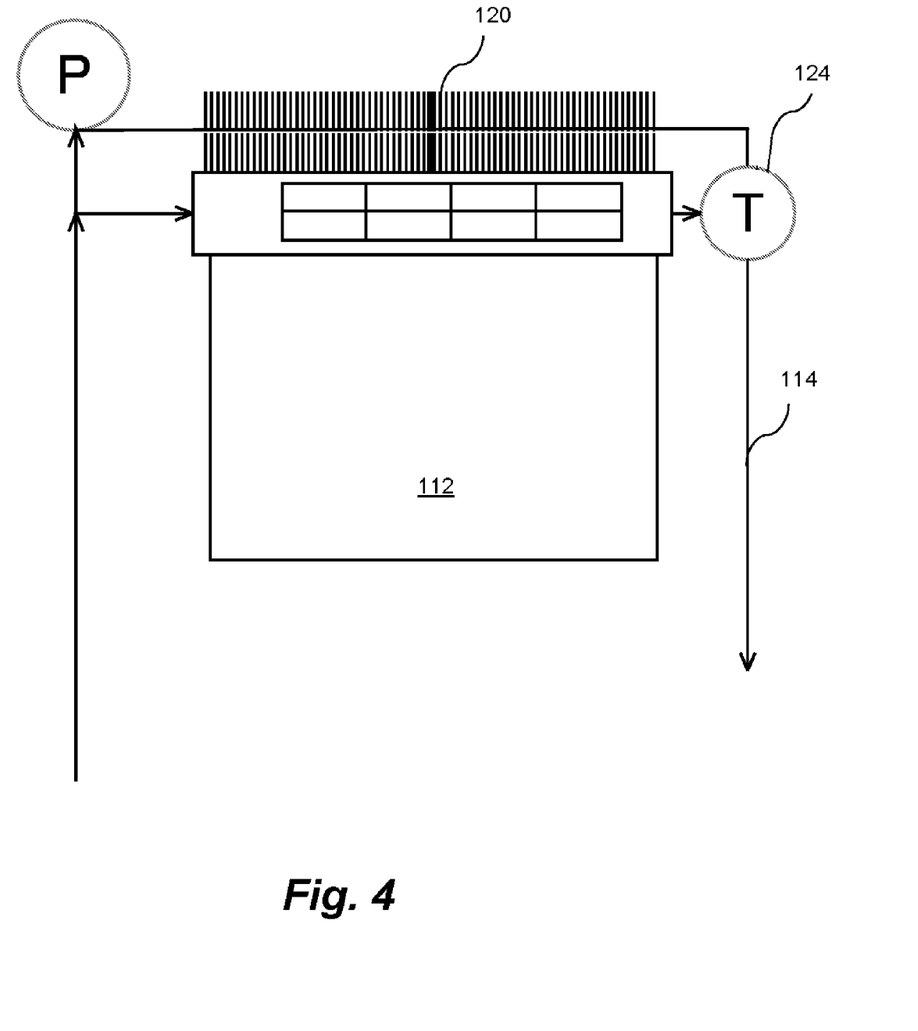
FIG. 4 is a schematic illustrating flow of working fluid through the solar water heater system of FIG. 2A, at a maximum operating condition of the working fluid in the system.

As shown in FIG. 4, when the temperature in the working fluid approaches the preset maximum operating temperature, the valve 124 begins to open, permitting at least a portion of the fluid to pass through the heat dissipater 120 to be cooled. The cooler fluid exits the heat dissipater 120 and mixes or recombines with the heated working fluid exiting the solar collectors 112 to maintain the temperature of the working fluid in the heat exchange circuit 114 at the preset maximum operating temperature. In order to permit maximum solar energy absorption by the solar collectors 120 without risk of overheating, the valve 124 is capable of opening fully to split the flow of working fluid between the solar collectors 112 and the heat dissipater 120. With the valve 124 fully open, the heat gain by the solar collectors 112 is balanced with the heat loss from the heat dissipater for maintaining the temperature of the working fluid at about or below the preset maximum operating temperature.

In embodiments of the invention, the heat dissipater 120 comprises a fin and tube radiator for exchanging heat from the working fluid to the atmosphere. Alternatively, the heat dissipater 120 could comprise a flat plate radiator, a ground loop or other type of heat sink to absorb the excess heat from the working fluid.

Figure 5:
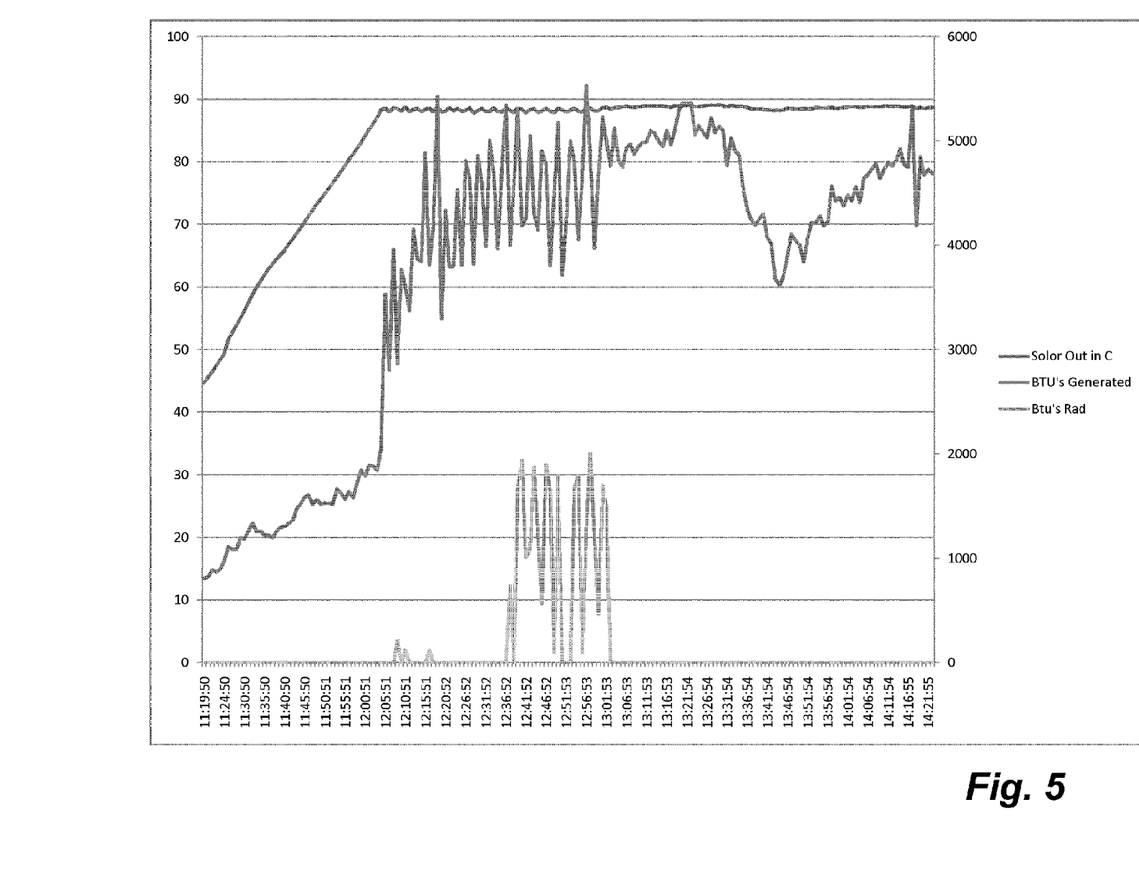
FIG. 5 is a graphical representation of working fluid temperature in degrees Centigrade, BTU's generated and BTU's dissipated using an embodiment of the invention and monitored through a mid-day period where solar energy is at a maximum.

With reference again to FIG. 4, during periods of high solar energy or insolation, such as midday and when the working fluid temperature approaches the preset maximum temperature, in this case 90° C., the thermally-actuated control valve 124 opens to bypass a slipstream of fluid through the heat dissipater 120 and remove heat from the working fluid. FIG. 5 represents a test of solar collectors, a fin and tube radiator for dissipating heat and a thermally-actuated control valve. There was no heating load on the system.

The heat exchange circuit 114 further comprises a variable speed DC pump 130 for pumping fluids through the heat exchange circuit 114. In order to remove any reliance upon the electric utility grid, the pump 130 is powered by a photovoltaic (PV) array or panel 132. The PV panel 132 may be integrated with the solar collectors 112 or may be remote from the solar collectors 112. Use of the PV panel 132 to create solar electricity causes the variable speed DC pump 130 to circulate the working fluid proportionately to the solar conditions. In other words, when solar energy or insolation is at a maximum, the pump circulates fluid more quickly through the heat exchange circuit 114 and, when solar energy is very low or not available, such as at night or in other low light conditions, the pumping slows or stops, effectively shutting down the system 110.

The heat exchange circuit 114 further comprises an expansion tank 140 to accommodate increases in volume of the working fluid with increased temperature. A pressure relief valve (PRV) 142 is incorporated for releasing working fluid from the heat exchange circuit 114 in the event of a failure of the thermally-actuated control valve 124, the pump 130 or a vapor lock within the system 110. Should the pressure in the heat exchange circuit 114 exceed a preset pressure, generally as a result of expansion beyond the capacity of the circuit 114, including the expansion tank 140, the PRV 142 opens and the working fluid is discharged. Such conditions can occur if the working fluid begins to vaporize.

To avoid collateral damage, the environmentally-friendly working fluid is discharged such as onto the roof or through conduits (not shown) which direct the working fluid away from structures which may be damaged thereby.

As shown in FIG. 2A, and in embodiments where the system is an indirect system, the heat transfer or exchange circuit 114 is connected between the solar collectors 112 and a heat exchanger 116 which is typically at the point of use 115. A working fluid, such as glycol, circulates through the exchange circuit 114. In the case of a water heater, the heat exchanger 116 is typically internal to a hot water tank 118 for exchanging heat between the working fluid and potable water contained in the hot water tank 118. Alternatively, the heat exchanger 116 can be external to the hot water tank 118. When intended for use in climates where ambient temperatures are low, such as in northern climates where temperatures may be below freezing, the working fluid comprises suitable amounts of antifreeze.

In embodiments where the system is a direct system, the heat transfer circuit 114 is fluidly connected to the hot water tank 118 and potable water from the tank is the working fluid being circulated through the heat transfer circuit 114. Direct systems may be limited for use in climates where the temperature remains above freezing as antifreeze cannot be mixed with the potable water flowing therethrough.

Example

In an indirect solar water heater system, according to an embodiment of the invention and as shown schematically in FIG. 2A, a solar collector 112 comprising 30, 58 mm×1800 mm evacuated tubes, rated at a maximum thermal output of about 7400 BTU per hour, available from Jiangsu Sunrain Co. Ltd., was mounted to the roof of a structure. The collector assembly was mounted at an angle of about 70 degrees from horizontal to ensure solar gain was maximized during the winter and minimized during the summer as is known in the art.

The solar collector 112 was thermally and fluidly connected to a 300 L (80 USG) hot water tank 118 located within the structure, using ¾" cross-linked polyethylene (PEX) pipe and fittings, for forming the heat exchange circuit 114, through which a working fluid was circulated. All piping in the system was insulated to reduce energy losses.

The working fluid for circulation through the heat exchange circuit comprised distilled water mixed at about 50% with non-toxic propylene glycol to ensure the fluid would not freeze at −40° C. temperatures. An expansion tank 140, having a volume sufficient to contain about 2.5% of the volume of the fluid at 20° C., was fluidly connected to the heat exchange circuit 114. The pressure within the heat exchange circuit 114 was maintained at a lower pressure than that in the hot water tank 118 to avoid glycol from entering the domestic hot water system in the event of a leak in the internal heat exchanger 116.

Fill and drain valves 150 were incorporated into the heat exchange circuit 114 to facilitate loading the circuit 114 and to permit periodically checking the pH and strength of the glycol/water mixture.

A pressure relief valve (PRV) 142 having a preset threshold of about 50 psi was connected to the heat exchange circuit 114. Should the pressure within the circuit 114 exceed the preset threshold, for example as a result of a failure in the system, the PRV 142 would open and the working fluid would be released to the roof of the structure.

An 8 foot length of fin and tube radiator 120, sized to exceed the maximum BTU rating of solar collector 112 by about 5% or about 40 BTU per hour, was connected to the heat exchange circuit 114 to bypass the solar collector 112. An inlet 121 to the radiator 120 was upstream from the solar collector 112 and an outlet 122 from the radiator 120 was downstream from the solar collector 112.

A bimetallic thermal by-pass valve 124, available from Caleffi Hydronics Solutions (Part #309460) was connected to the heat exchange circuit 114 downstream from the solar collector 112 and the heat dissipater 120. The preset maximum operating temperature of the valve was 90° C. (200° F.) for diverting flow from the heat exchange circuit 114 to the inlet 121 of the heat dissipater 120 and bypassing the solar collector 112 if the temperature in the working fluid exceeded 90° C.

A variable DC Pump 130, such as a 12 VDC, 20 watt, 8 liter/min pump, such as an El CID pump available from Ivan Labs Inc. or an Ecocirc pump available from Laing Thermotech, Inc., was used to pump the working fluid through the heat exchange circuit 114. The pump 130 was powered by a 25 watt photovoltaic panel available from Fuzhou Pingchi Import & Trading Co of China.

An anti-scald valve 160, such as a Danfoss ESSBE 065B8870 valve available from Danfoss Hydronic Heating North America, was placed on an outlet of the hot water tank 118 to act as a safety device for ensuring water exiting the tank 118 would not exceed a safe temperature, in this case from about 50° C. (122° F.) to about 60° C. (140° F.) where higher temperatures are required for appliances such as dishwashers and clothes washer.

The embodiments of the invention in which an exclusive property or privilege is claimed are defined as follows:

1. Apparatus for maximizing thermal energy collection in a solar collection system independent from the electric utility grid or external energy provider comprising:
    one or more solar collectors for solar energy collection;
    a heat dissipater having an inlet upstream from, and fluidly and thermally connected, to the solar collectors and an outlet downstream from the solar collectors, the heat dissipater forming a bypass around the solar collectors for cooling any portion of a working fluid flowing therethrough;
    a heat exchange circuit having the working fluid circulating therein and being fluidly and thermally connected between an outlet downstream of the solar collectors and a point of use and between the point of use and an inlet upstream of the heat dissipater;
    a solar powered pump for substantially continuously pumping the working fluid through the heat exchange circuit during solar energy collection; and
    a three-way valve connecting the heat dissipater and the solar collectors for mixing the working fluid downstream
    of the heat dissipater and the solar collectors, the three-way valve self-modulating between open and closed in response to a condition of the mixed working fluid at the three-way valve so as to alter the rate of fluid flowing through the heat dissipater and balancing the flow of working fluid from the heat dissipater and the solar collectors during solar energy collection by the solar collectors, the valve
        closing in response to the condition being at or below a maximum preset operating condition for preventing working fluid in the heat dissipater from exiting the heat dissipater and for directing the entirety of the flow of the working fluid through the solar collectors; and
        opening in response to the condition exceeding the maximum preset operating condition for cooling at least a portion of the working fluid flowing through the heat dissipater, the cooled working fluid being returned through the three-way valve to the heat exchange circuit for mixing with heated working fluid exiting the solar collectors for maintaining the working fluid at or below the maximum preset operating condition.

2. The apparatus of claim 1 wherein the three-way valve is a thermally-actuated control valve and the condition is the temperature of the mixed fluid at the three-way valve.

3. The apparatus of claim 2 wherein the maximum preset operating temperature is 90° C.

4. The apparatus of claim 1 wherein the three-way valve is a pressure-actuated control valve and the condition of the fluid is the pressure of the mixed fluid at the three-way valve.

5. The apparatus of claim 1 further comprising a photovoltaic panel for powering the solar-powered pump.

6. The apparatus of claim 5 wherein the solar powered pump is a variable speed direct current pump, the pumping speed being relative to an amount of solar energy at the photovoltaic panel.

7. The apparatus of claim 1 wherein the heat exchange circuit is an indirect heat exchange circuit and the working fluid therein comprises a mixture of propylene glycol and water.

8. The apparatus of claim 1 wherein the heat exchange circuit is a direct heat exchange circuit and the working fluid therein is a fluid utilized at the point of use.

9. The apparatus of claim 7 wherein the heat exchange circuit further comprises an expansion tank.

10. The apparatus of claim 7 wherein the heat exchange circuit further comprises a pressure relief device for discharging the working fluid from the heat exchange circuit at a preset pressure.

11. The apparatus of claim 1 wherein the one or more solar collectors are sized for maximum solar energy absorption and the heat dissipater is sized to balance heat loss with heat gain.

12. A method for maximizing thermal energy collection in a solar collection system independent from the electric utility grid or external energy provider comprising one or more solar collectors for solar energy collection, and a heat exchange circuit having a working fluid therein, the heat exchange circuit being fluidly and thermally connected between the one or more solar collectors and a point of use and between the point of use and a heat dissipater having an inlet upstream from the solar collectors, the method comprising:
continuously circulating the working fluid through the heat exchange circuit and the one or more solar collectors using a solar-powered pump to heat the circulating working fluid; and
monitoring a condition of the heated working fluid, and when the condition exceeds a maximum preset operating condition indicative of overheating,
modulating a three-way valve connecting the heat dissipater and the solar collectors in response to the condition of the circulating working fluid for altering the rate of fluid flowing through the heat dissipater and balancing a flow of working fluid from the heat dissipater and the solar collectors during solar energy collection by the solar collectors for
cooling at least a portion of the working fluid in the heat dissipater
by opening the three-way valve in response to the condition exceeding the maximum preset operating condition, the cooled working fluid being returned through the three-way valve to the heat exchange circuit for mixing with heated working fluid exiting the solar collectors for maintaining the circulating working fluid at or below the maximum preset operating condition; and
preventing working fluid in the heat dissipater from exiting the heat dissipater by closing in response to the condition being at or below the maximum preset operating condition for directing the entirety of the flow of working fluid through the solar collectors for heating the working fluid therein.

13. The method of claim 12 wherein the bypassing of at least a portion of the circulating working fluid further comprises modulating a flow of the circulating working fluid to the heat dissipater.

14. The method of claim 12 wherein the monitoring of the condition comprises monitoring the temperature of the heated working fluid in the heat exchange circuit and if the temperature of the heated working fluid exceeds a maximum preset operating temperature, bypassing at least the portion of the continuously pumped circulating working fluid around the one or more solar collectors.

15. The method of claim 12 wherein the monitoring of the condition comprises monitoring the pressure of the heated working fluid in the heat exchange circuit and if the pressure exceeds a maximum preset operating pressure, bypassing at least the portion of the circulating working fluid around the one or more solar collectors.

16. The method of claim 12 further comprising:
monitoring the pressure in the heat exchange circuit at a pressure relief valve and, if the pressure in the heat exchange circuit exceeds a preset pressure,
opening the pressure relief valve for releasing the circulating working fluid from the heat exchange circuit.

* * * * *